Figure 1:
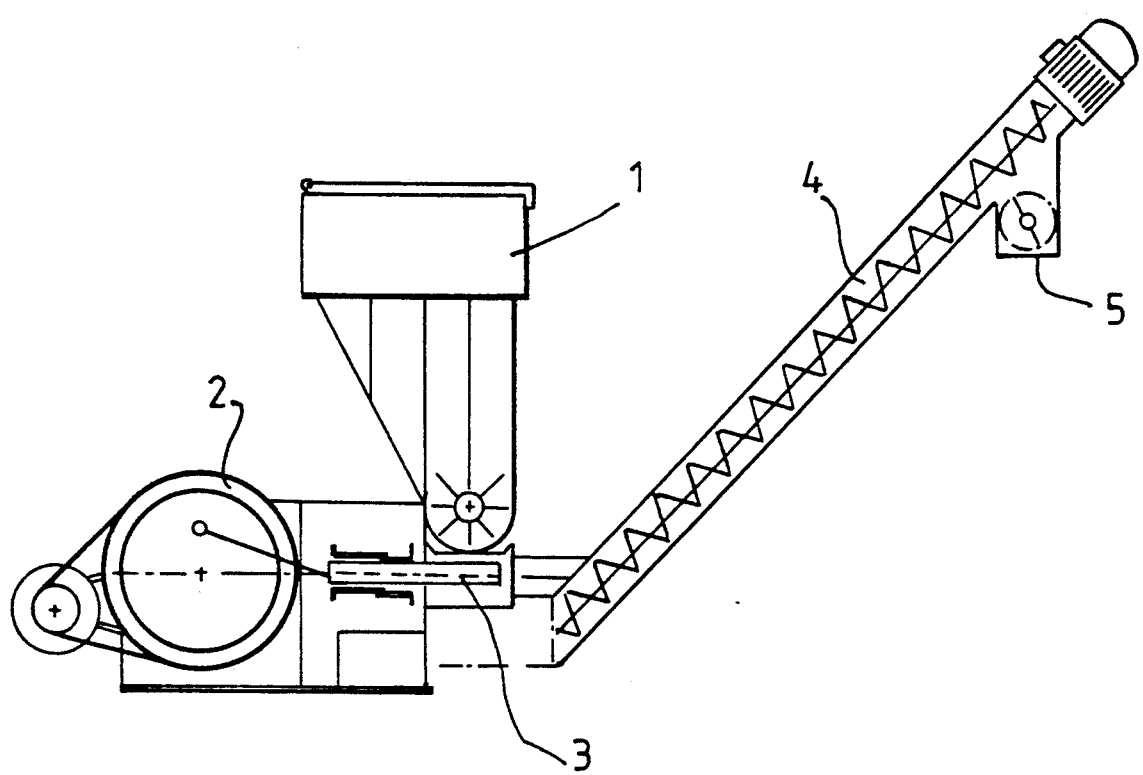

United States Patent
Adelmann

[11] Patent Number: 5,251,824
[45] Date of Patent: Oct. 12, 1993

[54] PROCESS FOR THE REMOVAL OF FOAMING AGENTS FROM FOAMED PLASTICS

[76] Inventor: Waldemar Adelmann, Von-Bodelschwingh Str. 67, D-8782 Karlstadt, Fed. Rep. of Germany

[21] Appl. No.: 703,925

[22] Filed: May 22, 1991

[30] Foreign Application Priority Data

May 22, 1990 [DE] Fed. Rep. of Germany ....... 4016512

[51] Int. Cl.$^5$ ................................................ B09B 5/00
[52] U.S. Cl. ................................ 241/3; 241/DIG. 38
[58] Field of Search .................. 241/3, 101.4, 260.1, 241/73, DIG. 38

[56] References Cited

U.S. PATENT DOCUMENTS

| | | | |
|---|---|---|---|
| 3,627,211 | 12/1971 | Leach | 241/3 |
| 3,630,820 | 12/1971 | Leach | 241/3 X |
| 3,768,739 | 10/1973 | George | 241/17 X |
| 3,774,852 | 11/1973 | Edlund | 241/3 |
| 4,321,027 | 3/1982 | Stoehr et al. | 241/3 X |
| 4,359,193 | 11/1982 | Schöert | 241/3 |
| 4,448,738 | 5/1984 | Crocker | 241/93 X |
| 4,627,580 | 12/1986 | Marbach | 241/101.4 |
| 4,783,010 | 11/1988 | Kissel | 241/3 |
| 4,815,668 | 3/1989 | Frei | 241/DIG. 38 X |
| 5,074,477 | 12/1991 | Welter et al. | 241/DIG. 38 X |

FOREIGN PATENT DOCUMENTS

| | | |
|---|---|---|
| 3535633 | 4/1987 | Fed. Rep. of Germany ... 241/DIG. 38 |
| 3905610 | 9/1990 | Fed. Rep. of Germany ... 241/DIG. 38 |
| 3906516 | 9/1990 | Fed. Rep. of Germany ... 241/DIG. 38 |
| 3911596 | 10/1990 | Fed. Rep. of Germany ... 241/DIG. 38 |
| 3033699 | 2/1988 | Japan ......................... 241/DIG. 38 |

Primary Examiner—Timothy V. Eley
Assistant Examiner—Frances Chin
Attorney, Agent, or Firm—Edwin D. Schindler

[57] ABSTRACT

The invention concerns a process for the removal of foaming agents, especially CFCS, from foamed plastics, whereby the foamed plastic is first compressed and afterwards comminuted in an unit and the released foaming agents extracted.

12 Claims, 2 Drawing Sheets

PROCESS FOR THE REMOVAL OF FOAMING AGENTS FROM FOAMED PLASTICS

The invention concerns a process for the removal of foaming agents, especially CFCS (chlorofluorohydrocarbons), from foamed plastics as well as a device for the execution of this process.

As is well known, foamed plastics are porous and are very light materials made of various plastics, such as, for example polyurethane resins (PUR), which are produced through foaming by using foaming agents. For this purpose it is common to use chlorofluorohydrocarbons (CFCS), concerning which has become known in the recent past that even the smallest amounts escaping into the air can lead to considerable destruction of the ozone layer surrounding the earth protecting it against dangerous penetrating radiation. In the recent past, in order to protect the environment, considerable effort has been applied to the task of stopping chlorofluorohydrocarbons from escaping into the atmosphere. Attention has focused on the disposal of especially hard foamed plastics produced with the use of CFCS as foaming agents, which find application as thermal and acoustic insulation, for example, in refrigeration technology and refrigerator production, in the pores of which the foaming agent is enclosed.

At the crux of the problem, is the release of the foaming agent from the pores and its separation from the foamed plastic.

In principle, the foaming agent may be removed by pulverizing the foamed plastic. This method is ruled out because the base material is wet and the powder obtained sticky and lumpy in consistency. Furthermore, during the pulverization of the foamed plastic, reliable separation of the foaming agent from the air and dust is costly. Moreover, it is known from patent application P 39 03 141 stemming from the applicant that foamed plastic may be worked through the impaction of a traversing striker, thus releasing the foaming agent. The foaming agent yield has proved to be unsatisfactory.

On this basis, it is the object of this invention to provide a process which enables the best possible yield of foaming agent from the foamed plastic.

This object is achieved by this invention through the compression of the foamed plastic, its subsequent comminution in a gas-tight unit and through the extraction of the foaming agent released.

The proposed process comprises two successive steps: during the first the plastic material is compacted and compressed. Due to the high pressure and resulting increase in temperature, the foaming agent vaporizes, especially if like chlorofluorohydrocarbons it has a vaporization temperature of 23.8 degrees centigrade. As a result of the compression, the surface of the foamed plastic hardens preventing the gaseous foaming agents from reaching the outside and being released. In order to facilitate this, the compacted foamed plastic must be comminuted so that the foaming agent can escape. Exhalation takes place during comminution. The foaming agent is extracted together with air, separated and collected. In order to prevent the foaming agent from escaping into the atmosphere, at least comminution is to take place in a gas-tight space.

The process according to this invention is suitable for foamed plastics of the most varied chemical composition and is especially also suitable for polyurethane resin. Just as the foaming agent used too may be in principle optional. Applied pressures are lower, the lower the vaporization temperatures of the foaming agents, which is why the process is particularly suitable for the extraction of chlorofluorocarbons, which vaporize at temperatures of 23.8 degrees centigrade. The decisive advantage of the process according to this invention consists therein that release of the foaming agent is achieved at a comparatively low cost and leaves only a minimal residue.

The manner and way in which the foamed plastic is compressed is principally optional within the framework of the invention. Compression into briquettes is seen as being particularly advantageous.

In order to rule out any undesirable escape of the foaming agent into the atmosphere, at least the exhalation process defined by comminution is to be carried out in a gas-tight unit.

An escape of the foaming agent is practically ruled out, if, as is proposed further, the unit operates at negative gage pressure, so that the pressure gradients additionally oppose any escape of the foaming agent.

In order to further reduce the quantity of residue, it is proposed in an especially favored embodiment to cut up the foamed plastic before the process described above and to extract the foaming agent released thereby. Within the sense of this invention, the term "cutting up", as opposed to milling, is understood to mean a comminution without a simultaneous heating of the material. The cutting up process does not result in any considerable heating. Milling (or also pulverization) results in the destruction of part of pores and in the release of foaming agent. Depending how fine the milling is (production of powder is undesirable for reasons described above), a certain proportion of cells remain intact. Further, the heat generated here by the milling process also results in a vaporization of the foaming agent and in an additional release of foaming agent. Here too, the process is carried out in a gas-tight unit and the foaming agent is extracted together with a mixture of air.

Generally, it is unavoidable that quantities of air are extracted with the foaming agent. Separation can be carried out advantageously by means of condensation.

In the following, devices are described, however, without the limitations of generality, which in a special way are suitable for the realization and translation of the process according to this invention. Compression of the foamed plastic is achieved with the aid of a briquette press, to which is connected a comminution element for the release of the foaming agent and which includes an extraction device. The comminution element is especially a helical screw. The briquettes are fed in, are broken up by the screw, whereby, encouraged by the additional heat generated, foaming agent is released.

For the cutting up of the foamed plastic before compression, a mill is superposed on the the briquette press. The mill reduces the foamed plastic to die-sized elements, whilst avoiding the generation of powder. Here also, a part of the foaming agent is removed, although within the sense of a coarse process. A minimal residue cannot be achieved by means of this method.

A concrete realization of this mill consists in the disposition of pairs of cutting wheels above a perforated sieve. The fed-in base material is comminuted by the contra-rotating cutting wheels, is conveyed to the sieve and pressed through this.

Further details, features and advantages of the invention can be taken from the following descriptive part in which a typical embodiment is explained in greater detail with the aid of the drawings. It is shown FIG. 1 a schematic side view of the device according to this invention.

Figure 2:
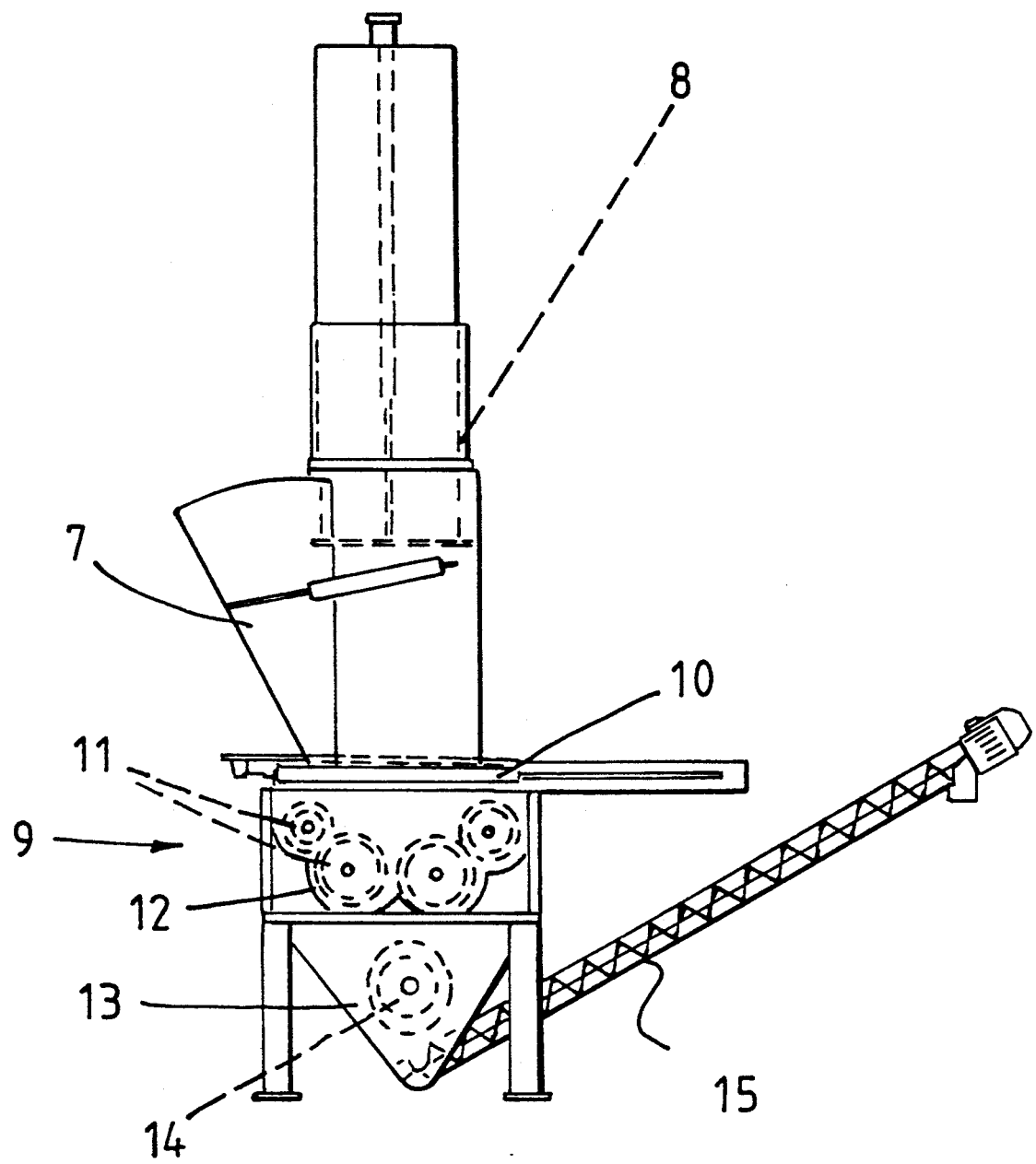

FIG. 2 a superposed comminution element on the device shown in FIG. 1.

In FIG. 1 a hopper for the reception of the base material is disposed above a briquette press (2), in which, as is shown, a piston (3) compresses the supplied material and pushes this in a compact state in a horizontal direction towards outside.

Here is disposed a helical screw (4), which receives the compact, compressed foamed plastic, comminutes it and and conveys it away. Only then are foaming agents trapped inside by the highly compressed surface released, encouraged by the heat generated through the milling process, collected and removed via an extraction device (5). As a result, only a minimal quantity of foaming agent remains as a residue.

A decisive improvement in the degree of efficiency can be achieved if the cominution element is superposed as shown in FIG. 2, so that the briquette press (2) is supplied with pre-comminuted and partially degassed foamed plastic. The base material is fed in via a feed shaft (7) and is supplied to a mill (9) by means of a plunging device (8). Disposed in between is a sliding valve (10) as a seal.

The mill (9) comprises pairs of cutting wheels (11) as well as a perforated sieve (12). Comminution is achieved on the one hand by the pairs of cutting wheel themselves and afterwards when the material is pressed through the perforated sieve (12).

A collection tank (13) is disposed below, from where the foaming agent is removed via an extraction line (14), and foamed plastic particles collecting here are conveyed by a helical screw (15) to the hopper (1) of the system shown in FIG. 1.

As a result, the device according to this invention allows the removal of foaming agents and here especially of chlorofluorohydrocarbons (CFCS), leaving only a minimal quantity of residue.

I claim:

1. A process for the removal of a foaming agent from a foamed plastic, comprising the steps in the order of:
    compressing a foamed plastic containing a foaming agent intended for removal from said foamed plastic; and,
    comminuting said foamed plastic in a gas-tight unit for extracting said foaming agent from said foamed plastic.

2. The process for the removal of a foaming agent from a foamed plastic according to claim 1, wherein said comminuting step is carried out at a negative gage pressure.

3. The process for the removal of a foaming agent from a foamed plastic according to claim 1, wherein the foamed plastic is compressed into briquettes during said compressing step.

4. The process for the removal of a foaming agent from a foamed plastic according to claim 1, further comprising the steps of separating said foaming agent, extracted with air during said comminuting step, from air and collecting said foaming agent following said separation from air.

5. The process for the removal of a foaming agent from a foamed plastic according to claim 4, wherein said comminuting step is carried out at a negative gage pressure.

6. The process for the removal of a foaming agent from a foamed plastic according to claim 4, further comprising the step of condensing said foaming agent following said collecting step.

7. A process for the removal of a chlorofluorohydrocarbon (CFC) from a foamed plastic, comprising the steps in the order of:
    compressing a foamed plastic containing a CFC intended for removal from said foamed plastic; and,
    comminuting said foamed plastic in a gas-tight unit for extracting said CFC from said foamed plastic.

8. The process for the removal of a chlorofluorohydrocarbon (CFC) from a foamed plastic according to claim 7, wherein said comminuting step is carried out at a negative gage pressure.

9. The process for the removal of a chlorofluorohydrocarbon (CFC) from a foamed plastic according to claim 7, wherein the foamed plastic is compressed into briquettes during said compressing step.

10. The process for the removal of a chlorofluorohydrocarbon (CFC) from a foamed plastic according to claim 7, further comprising the steps of separating said CFC, extracted with air during said comminuting step, from air and collecting said CFC following said separation from air.

11. The process for the removal of a chlorofluorohydrocarbon (CFC) from a foamed plastic according to claim 10, wherein said comminuting step is carried out at a negative gage pressure.

12. The process for the removal of a chlorofluorohydrocarbon (CFC) from a foamed plastic according to claim 10, further comprising the step of condensing said CFC following said collecting step.

* * * * *